(12) United States Patent
Itagaki et al.

(10) Patent No.: US 11,159,723 B2
(45) Date of Patent: Oct. 26, 2021

(54) VIBRATION DETECTING APPARATUS IN IMAGE PICKUP APPARATUS EQUIPPED WITH IMAGE STABILIZATION MECHANISM, AND IMAGE PICKUP APPARATUS

(71) Applicant: CANON KABUSHIKI KAISHA, Tokyo (JP)

(72) Inventors: Shimpei Itagaki, Tachikawa (JP); Mai Nakabayashi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/828,301

(22) Filed: Mar. 24, 2020

(65) Prior Publication Data

US 2020/0314341 A1  Oct. 1, 2020

(30) Foreign Application Priority Data

Mar. 25, 2019 (JP) .............................. JP2019-057074

(51) Int. Cl.
*H04N 5/232* (2006.01)
*G01H 1/00* (2006.01)
(Continued)

(52) U.S. Cl.
CPC ........... *H04N 5/23258* (2013.01); *G01H 1/00* (2013.01); *H04N 5/23264* (2013.01)

(58) Field of Classification Search
CPC ........... H04N 5/23258; H04N 5/23264; H04N 5/23251; G01C 19/56; G01P 15/18; G02B 27/64; G02B 27/646; G01H 1/00; G01H 1/12

USPC ... 348/208.2, 208.99, 208.4, 208.11, 208.13, 348/205.806; 396/55, 52, 53, 13, 421, 396/657; 359/554, 217.3, 526; 382/255, 382/264, 275

See application file for complete search history.

(56) References Cited

U.S. PATENT DOCUMENTS 7,830,416 B2 * 11/2010 Tanaka .................... H04N 5/228
                                                              348/208.7
8,218,018 B2 *  7/2012 Washisu .................. H04N 5/228
                                                              348/208.7

(Continued)

FOREIGN PATENT DOCUMENTS

JP         2018-060160 A     4/2018

*Primary Examiner* — Marly S Camargo
(74) *Attorney, Agent, or Firm* — Cowan, Liebowitz & Latman, P.C.

(57) ABSTRACT

A vibration detecting apparatus capable of accurately detecting camera shake by making resonant frequencies in damping members in directions of detection axes of gyro sensors substantially uniform. The gyro sensors which detect shake are held on a sensor holder. The first damping member abuts against at least a part of an outer periphery of a first surface of the sensor holder, wherein the area of a region of the first damping member which abuts against the first surface is smaller than the area of the first surface. The second damping member abuts against at least a part of an outer periphery of a second surface of the sensor holder which is, in a predetermined direction, opposite to the first surface, wherein the area of a region of the second damping member which abuts against the second surface is smaller than the area of the second surface.

26 Claims, 14 Drawing Sheets

(51) Int. Cl.
*G01H 1/12* (2006.01)
*G02B 27/64* (2006.01)

(56) References Cited

U.S. PATENT DOCUMENTS

| | | | | |
|---|---|---|---|---|
| 8,238,736 | B2 * | 8/2012 | Tsuruta | G03B 17/00 |
| | | | | 396/55 |
| 8,908,086 | B2 * | 12/2014 | Kawai | H04N 5/232 |
| | | | | 348/352 |
| 9,891,445 | B1 * | 2/2018 | Miller | G02B 27/646 |
| | | | | 348/208.5 |
| 10,171,737 | B2 * | 1/2019 | Kikuchi | H04N 5/23258 |
| 10,247,957 | B2 * | 4/2019 | Sato | G02B 27/64 |
| 10,412,279 | B2 * | 9/2019 | Osaka | H04N 5/225 |
| 10,652,443 | B2 * | 5/2020 | Liu | H04N 5/225 |
| 2010/0165131 | A1 * | 7/2010 | Makimoto | H04N 5/228 |
| | | | | 348/208.7 |
| 2013/0050828 | A1 * | 2/2013 | Sato | G02B 27/64 |
| | | | | 359/557 |
| 2018/0017844 | A1 * | 1/2018 | Yu | G03B 16/36 |
| 2018/0348538 | A1 * | 12/2018 | Sugawara | G02B 27/64 |
| 2019/0191092 | A1 * | 6/2019 | Imanishi | H04N 5/23287 |
| 2020/0007768 | A1 * | 1/2020 | Ohtsuka | H04N 5/232 |
| 2020/0049939 | A1 * | 2/2020 | Lee | G02B 7/10 |
| 2020/0050014 | A1 * | 2/2020 | Park | G02B 27/646 |
| 2020/0371404 | A1 * | 11/2020 | Saito | G03B 5/04 |

* cited by examiner

VIBRATION DETECTING APPARATUS IN IMAGE PICKUP APPARATUS EQUIPPED WITH IMAGE STABILIZATION MECHANISM, AND IMAGE PICKUP APPARATUS

BACKGROUND OF THE INVENTION

Field of the Invention

The present invention relates to a vibration detecting apparatus and an image pickup apparatus, and in particular to a technique for detecting vibrations in an image pickup apparatus equipped with an image stabilization mechanism.

Description of the Related Art

In general, an image pickup apparatus equipped with shake detectors (for example, gyro sensors) which detect shake of the image pickup apparatus is known. For example, in an image pickup apparatus with an interchangeable taking lens unit (interchangeable lens), at least the interchangeable lens or a main body of the image pickup apparatus is equipped with the shake detectors.

If high-frequency external vibration such as shutter shock associated with movement of a mechanical shutter during shutter release is input to gyro sensors, large errors will appear in gyro sensor's outputs. Accordingly, a method for preventing input of high-frequency vibrations by fixing gyro sensors to the image pickup apparatus via damping members is known (Japanese Laid-Open Patent Publication (Kokai) No. 2018-60160).

If a specific high frequency called a detuning frequency is input to the gyro sensors, accurate angular velocities cannot be output, and this will adversely affect image stabilization. Fixing the gyro sensors to the image pickup apparatus via the damping members can prevent high-frequency vibrations equal to or greater than a resonant frequency of the damping members from being transmitted to the gyro sensors.

However, if the resonant frequency of the damping members is lowered to a frequency range in which image stabilization is performed (for example, 1 Hz to 10 Hz), the responsivity of the gyro sensors will become worse due to a phase delay to make image stabilization inaccurate. Namely, to accurately detect camera shake, the resonant frequency of the damping members is required to be equal to or higher than the camera shake frequency range and lower than the detuning frequency.

According to Japanese Laid-Open Patent Publication (Kokai) No. 2018-60160 above, high-frequency vibrations equal to or higher than the camera shake frequency range can be suppressed by sandwiching the gyro sensors between the damping members. However, the resonant frequencies in the damping members in the directions of detection axes vary due to the influence of, for example, an asymmetrical shape of a holding member that holds the gyro sensor.

Because of such variations in the resonant frequencies, it is difficult to make the resonant frequencies in the damping members in the directions of all the detection axes equal to or higher than the camera shake frequency range and lower than the detuning frequency. For this reason, although it is desirable to make the resonant frequencies in the damping members in the directions of the detection axes of the gyro sensors uniform, making the resonant frequencies uniform is difficult with the method described in Japanese Laid-Open Patent Publication (Kokai) No. 2018-60160.

SUMMARY OF THE INVENTION

The present invention provides a vibration detecting apparatus and an image pickup apparatus which are capable of accurately detecting camera shake by making resonant frequencies in a damping member in directions of detection axes of a plurality of shake detecting units substantially uniform.

Accordingly, the present invention provides a vibration detecting apparatus comprising a shake detecting sensor configured to detect shake, a sensor holder configured to hold the shake detecting sensor, a first damping member configured to abut against a first surface of the sensor holder, and a second damping member configured to abut against a second surface of the sensor holder which is opposite to the first surface in a predetermined direction, wherein the first damping member abuts against at least a part of an outer peripheral portion of the first surface, and the area of a region of the first damping member which abuts against the first surface is smaller than the area of the first surface, and the second damping member abuts against at least a part of an outer peripheral portion of the second surface, and the area of a region of the second damping member which abuts against the second surface is smaller than the area of the second surface.

According to the present invention, camera shake is accurately detected by making resonant frequencies in damping members in directions of detection axes of a plurality of shake detecting units substantially uniform.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof.

Figure 1:
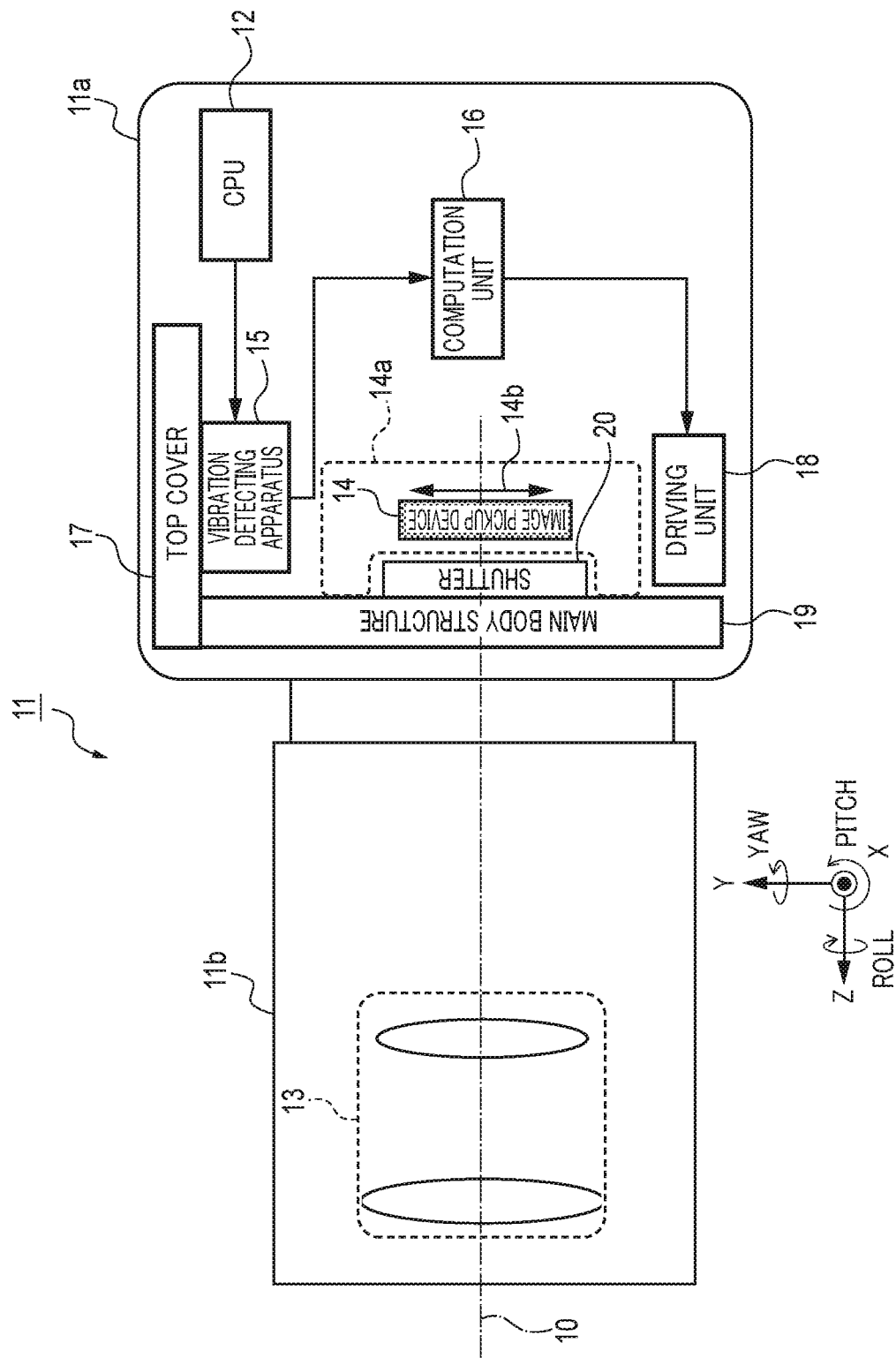
FIG. 1 is a block diagram showing an example of an image pickup apparatus equipped with a vibration detecting apparatus according to a first embodiment of the present invention.

FIG. 1 is a block diagram showing an example of an image pickup apparatus equipped with a vibration detecting apparatus according to a first embodiment of the present invention.

The illustrated image pickup apparatus is, for example, a digital camera (hereafter referred to merely as the camera) 11 and has a camera body (image pickup apparatus main body) 11a and an interchangeable lens unit (hereafter referred to merely as the interchangeable lens) 11b that is removable from the camera body 11a.

It should be noted that a coordinate system is defined as shown in FIG. 1, and a Z-axis is parallel to a shooting optical axis 10. It is assumed here that an axis of rotation in pitch is an X-axis, an axis of rotation in yaw is a Y-axis, and an axis of rotation in roll is the Z-axis. The interchangeable lens 11b may be integral with the camera body 11a.

The camera body 11a is equipped with a shake correction unit 14a and a CPU 12. The CPU 12 controls the camera 11 in response to, for example, a shooting instructing operation. In the illustrated camera 11, a subject image (optical image) is formed on an image pickup device 14 along the shooting optical axis (hereafter referred to merely as the optical axis) 10 via a shooting optical system 13 provided in the interchangeable lens 11b.

In the camera body 11a, a shutter 20 is interposed between the image pickup device 14 and the shooting optical system 13, and the shutter 20 enables switching between a state in which light directed toward the image pickup device 14 via the shooting optical system 13 is shielded and a state in which the light passes through.

The image pickup device 14 outputs an image signal according to an optical image formed on the image pickup device 14. It should be noted that the image signal is subjected to image processing by an image processing unit and stored as image data in a storage unit although this is not illustrated in the drawings.

A vibration detecting apparatus 15 is equipped with gyro sensors 22 (not shown in FIG. 1) and detects an angular velocity of shake applied to the camera 11. The image pickup device 14 is a component element of the shake correction unit 14a and driven on an XY plane perpendicular to the optical axis 10 by a driving unit 18 as indicated by a solid line arrow 14b in FIG. 1. As a result, a blurry image on a light-incident surface of the image pickup device 14 caused by shake of the camera 11 is corrected.

A computation unit 16 performs a target value computation (such as one-step integration) on an angular velocity signal, which is an output from the vibration detecting apparatus 15, to convert the angular velocity signal into an angular signal. The angular signal is then output as a shake angular signal to the driving unit 18. The driving unit 18 drives the shake correcting unit 14a (that is, the image pickup device 14) based on the shake angular signal to correct for the shake. It should be noted that a method to obtain an amount by which the shake correcting unit 14a is driven so as to correct for the shake (an amount corresponding to an amount of movement in the direction of the X-axis and the Y-axis, and an amount of rotation around the Z-axis) should not be particularly limited but a well-known method may be used insofar as outputs from the gyro sensors 22 are used, and hence detailed description thereof is omitted.

A main body structure 19 is a component for holding a plurality of units provided in the camera body 11a. A top cover 17 is an exterior component that covers an upper portion of the camera body 11a. In the illustrated example, the focal plane shutter (hereafter referred to merely as the shutter) 20, the shake correcting unit 14a, and the top cover 17 are fixed to the main body structure 19. The vibration detecting apparatus 15 is fixed to the top cover 17.

Figure 2:
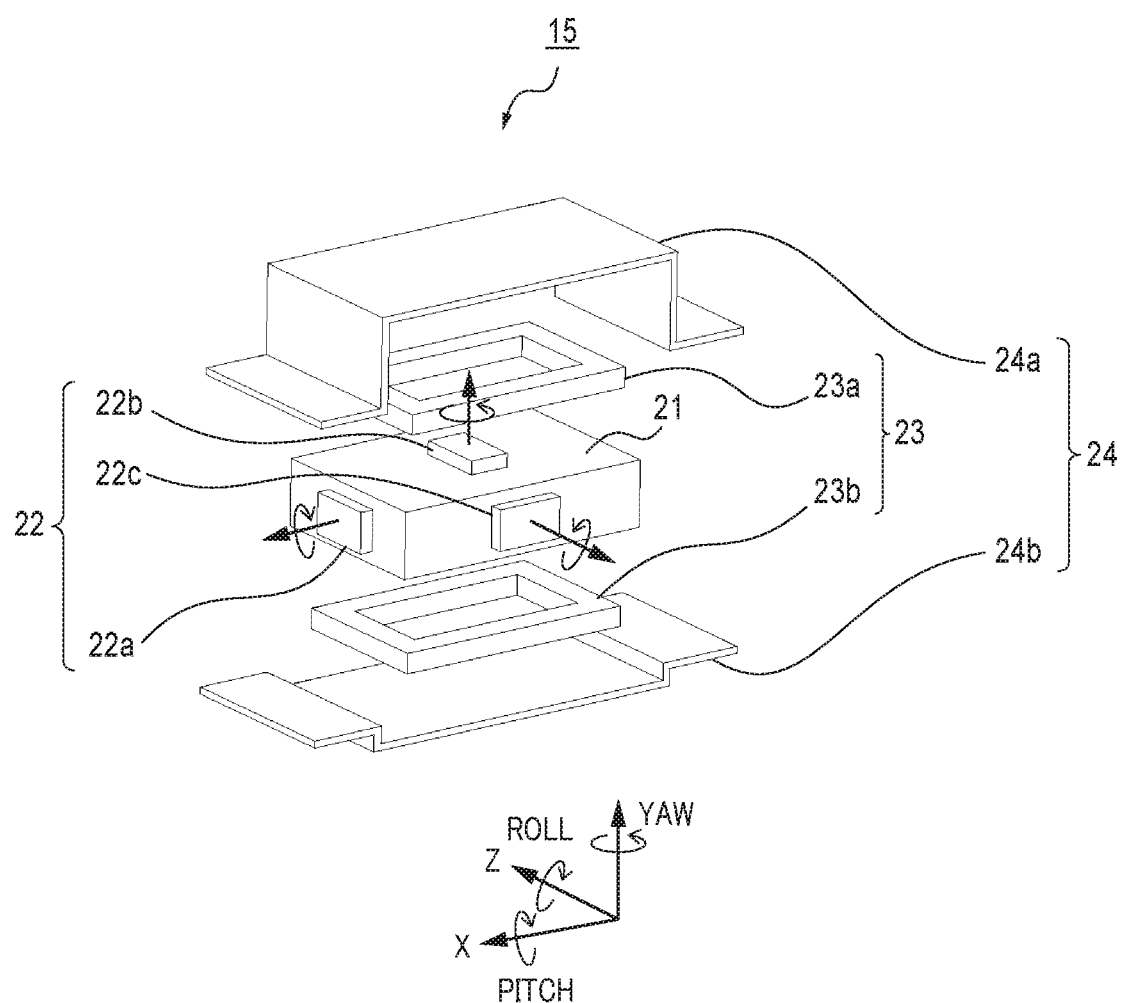
FIG. 2 is an exploded perspective view showing the vibration detecting apparatus appearing in FIG. 1.

FIG. 2 is an exploded perspective view showing the vibration detecting apparatus 15 appearing in FIG. 1.

The vibration detecting apparatus 15 has a plurality of (for example, three) gyro sensors (shake detecting sensors) 22 which are shake detecting units, and each of the gyro sensors 22 has one detection axis. The gyro sensors 22 are held on a gyro sensor holder 21. The vibration detecting apparatus 15 also has a first holding member 24a, a second holding member 24b, a first damping member 23a, and a second damping member 23b.

The illustrated vibration detecting apparatus 15 has the three gyro sensors 22 and hence has three vibration detection axes (hereafter referred to merely as the detection axes) in total. The gyro sensor holder 21 holds the detection axes of the respective three gyro sensors 22 in such a manner that the detection axes are substantially perpendicular to one another. It should be noted that the gyro sensor holder 21 may be comprised of a plurality of components. For example, a metal sheet component may reinforce a holder.

In the illustrated example, the three gyro sensors are denoted by reference numerals 22a. 22b, and 22c, respectively. In a three-dimensional coordinate, the detection axis of the gyro sensor 22a corresponds to the axis of rotation in pitch (coordinate axis X), and the detection axis of the gyro sensor 22b corresponds to the axis of rotation in yaw (coordinate axis Y). The detection axis of the gyro sensor 22c corresponds to the axis of rotation in roll (coordinate axis Z).

In the direction of the Y-axis, the first holding member 24a abuts against the first damping member 23a. In the direction of the Y-axis, the gyro sensor holder 21 has one surface thereof (first surface) abutting against a surface of the first damping member 23a which is opposite to a surface abutting against the first holding member 24a. In the direction of the Y-axis, the second damping member 23b abuts against a surface (second surface) of the gyro sensor holder 21 which is opposite to a surface abutting against the first damping member 23a. Namely, in the direction of the Y-axis, the gyro sensor holder 21 has the other surface (second surface) thereof abutting against the second damping member 23b. In the direction of the Y-axis, the second holding member 24b abuts against a surface of the second damping member 23b which is opposite to a surface abutting against the gyro sensor holder 21.

The first damping member 23a and the second damping member 23b cover the entire circumferences of outer peripheries of the respective surfaces of the gyro sensor holder 21 which the damping members 23a, 23b face. The surface area of each of the surfaces, which face the gyro sensor holder 21, of the first damping member 23a and the second damping member 23b is equal to or smaller than the surface area of each of the surfaces of the gyro sensor holder 21 which the damping members 23a. 23b face. The first damping member 23a and the second damping member 23b are each comprised of one component, and in the illustrated example, are molded into a "hollow square" shape.

Figure 3A:
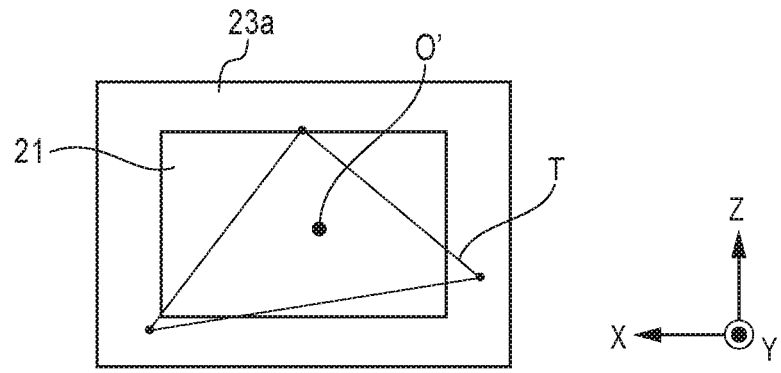
FIGS. 3A to 3C are views showing only a gyro sensor holder, a first damping member, and a second damping member appearing in FIG. 2.
Figure 3B:
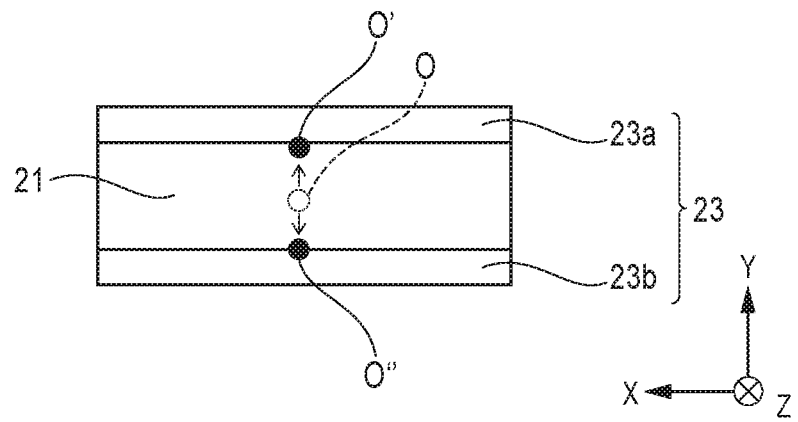
Figure 3C:
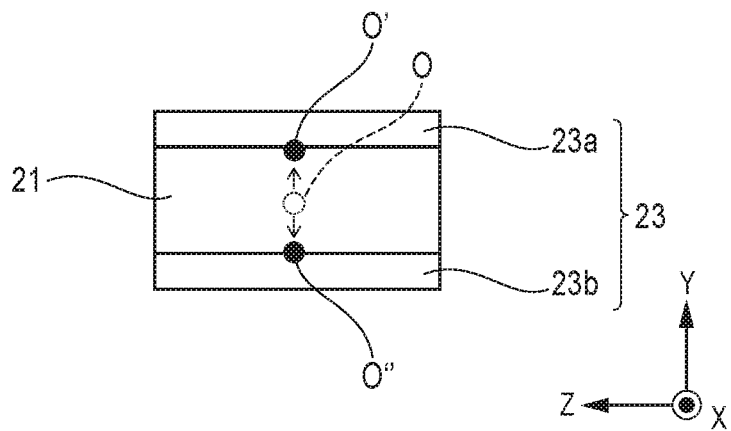

FIGS. 3A to 3C are views showing only the gyro sensor holder 21, the first damping member 23a, and the second damping member 23b appearing in FIG. 2. FIG. 3A is a view taken in the direction of the Y-axis, FIG. 3B is a view taken in the direction of the Z-axis, and FIG. 3C is a view taken in the direction of the X-axis.

Referring to FIGS. 3A to 3C, a point O indicates a barycenter of the gyro sensor holder 21, and a point O' indicates a point obtained by projecting the point O onto a surface parallel to the surface abutting against the first damping member 23a. A point O" indicates a point obtained by projecting the point O onto a surface parallel to the surface abutting against the second damping member 23b.

As shown in FIG. 3A, a triangle T including the point O' and the point O" can be formed by three points located inside the first damping member 23a. Although FIG. 3A shows only the first damping member 23a, the same applies to the second damping member 23b.

Figure 4A:
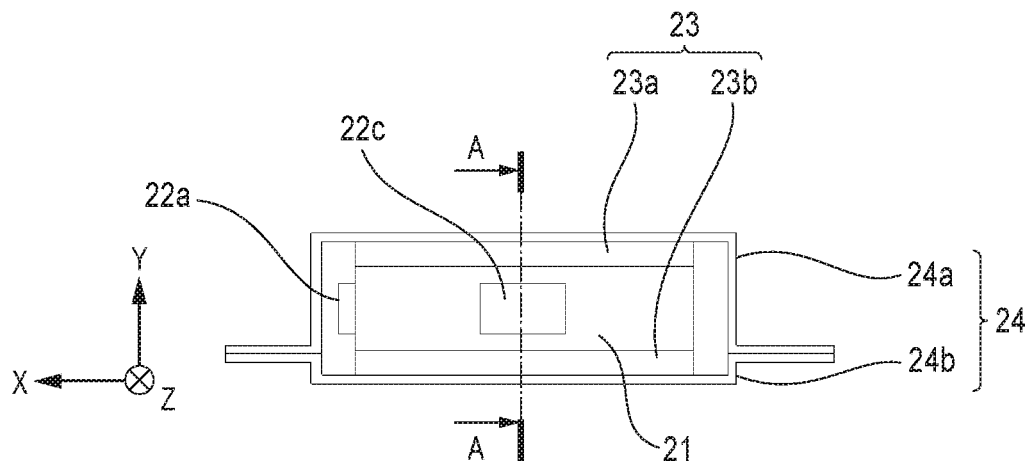
FIGS. 4A and 4B are views showing a structure of the vibration detecting apparatus appearing in FIG. 2.
Figure 4B:
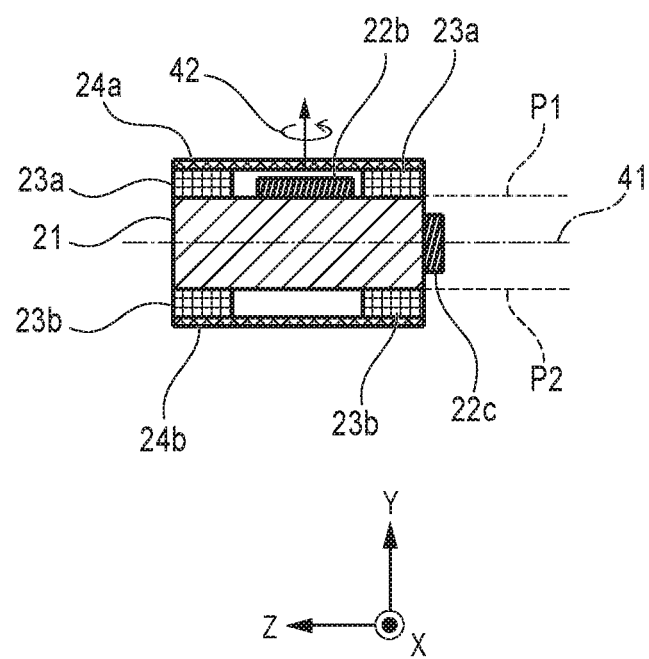

FIGS. 4A and 4B are views showing a structure of the vibration detecting apparatus 15 appearing in FIG. 2. FIG. 4A is a view of the vibration detecting apparatus 15 taken in the direction of the Z-axis, and FIG. 4B is a cross-sectional view taken along line A-A in FIG. 4A.

Referring to FIGS. 4A and 4B, P1 indicates abutting surfaces of the gyro sensor holder 21 and the first damping member 23a, and P2 indicates abutting surfaces of the gyro sensor holder 21 and the second damping member 23b. A solid-line arrow 42 indicates a direction of the detection axis of the gyro sensor 22b, and alternate long and short dashed lines 41 indicate a straight line parallel to the optical axis 10.

The abutting surfaces P1 and P2 (surfaces parallel to an XZ plane) are in orientations substantially parallel to the straight line 41 (parallel to the Z-axis) and also substantially vertical to the direction 42 (parallel to the Y-axis) of the detection axis of the gyro sensor 22b.

A description will now be given of operation of the camera 11 appearing in FIG. 1.

The shutter 20 has a front curtain and a rear curtain for shielding light, and in response to a shooting instructing operation and others, the front curtain and the rear curtain move to successively switch between a light shielding state and a light passing state. On this occasion, the front curtain and the rear curtain collide with a damping member or the like provided inside the shutter 20 to stop moving, and when they stop moving, shock occurs. The exposure continues over a time period from the time when the front curtain stops moving to the time when the rear curtain stops moving, and hence shock is caused to occur by the front curtain colliding with the damping member during the progress of the exposure. This is so-called shutter shock.

A gyro sensor has a specific frequency called a detuning frequency, and when a vibration of the detuning frequency equal to or greater than a predetermined threshold value is input to the gyro sensor, a phenomenon in which the gyro sensor does not output an accurate angular velocity (this will hereafter be referred to as the output error) occurs. Here, the detuning frequency is, for example, about 700 Hz, and shutter shock includes this frequency component.

Figure 5A:
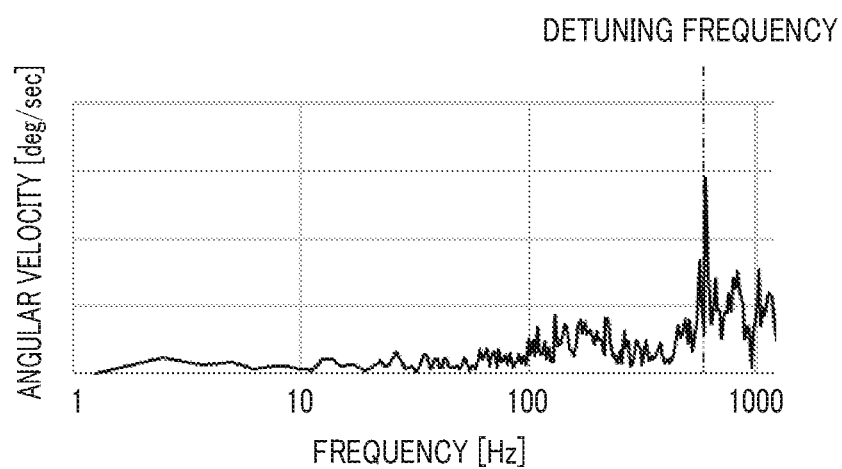
FIGS. 5A and 5B are views useful in explaining vibrations caused by shutter shock.
Figure 5B:
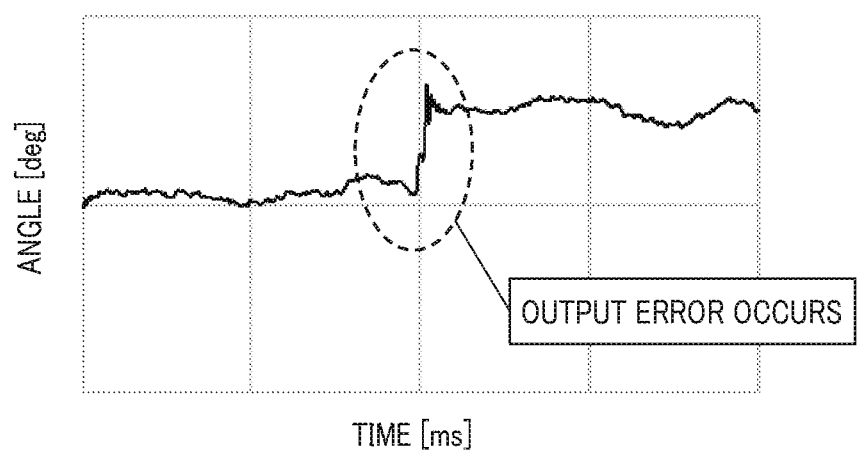

FIGS. 5A and 5B are views useful in explaining vibrations caused by shutter shock. FIG. 5A is a view showing vibrations caused by shutter shock, and FIG. 5B is a view showing angular signals corresponding to angular velocity signals output from the gyro sensor when the vibrations shown in FIG. 5A are input.

In FIG. 5A, the vertical axis indicates angular velocity, and the horizontal axis indicates frequency. A chain double-dashed line indicates the detuning frequency. It is apparent from FIG. 5A that shutter shock includes a vibration of the detuning frequency. When the vibrations shown in FIG. 5A are input, an angular signal obtained by one-step integration of an angular velocity signal output from the gyro sensor abruptly changes, causing the output error to occur.

Vibrations caused by shutter shock are input from the shutter 20 to the vibration detecting apparatus 15 via the main body structure 19 and the top cover 17. When the gyro sensor holder 21 is directly held by the first holding member 24a and the second holding member 24b, the vibration of the detuning frequency included in shutter shock equal to or greater than the predetermined threshold value is input to the gyro sensors 22. As a result, the output error may occur in the gyro sensors 22. This makes image stabilization inaccurate, causing a blurry image to be output.

A description will now be given of image stabilization which is performed in the camera 11 according to the first embodiment of the present invention.

To avoid the output error described above, the damping members 23a and 23b such as rubber are interposed between the gyro sensor holder 21 and the holding members 24a and 24b. The presence of the damping members 23a and 23b prevents high-frequency vibrations equal to or greater than a resonant frequency of the damping members 23a and 23b from being transmitted to the gyro sensors 22. Namely, depending on what resonant frequency the damping member 23a and 23b are designed to have, the vibration of the detuning frequency equal to or greater than the threshold value can be prevented from being transmitted to the gyro sensor 22.

However, if the damping members 23a and 23b are interposed between the gyro sensor holder 21 and the holding members 24a and 24b, and the resonant frequency is lowered to a frequency range of camera shake (for example, 1 Hz to 10 Hz), the response of the gyro sensor 22 will become worse due to a phase delay, making image stabilization inaccurate.

Figure 6A:
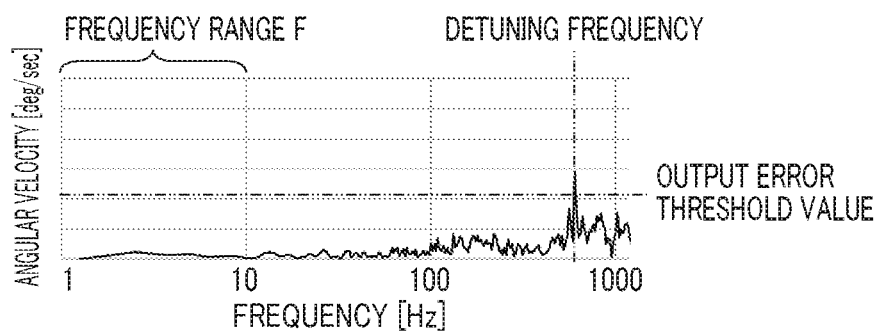
FIGS. 6A to 6E are views useful in explaining vibration detection by the vibration detecting apparatus appearing in FIG. 2.
Figure 6B:
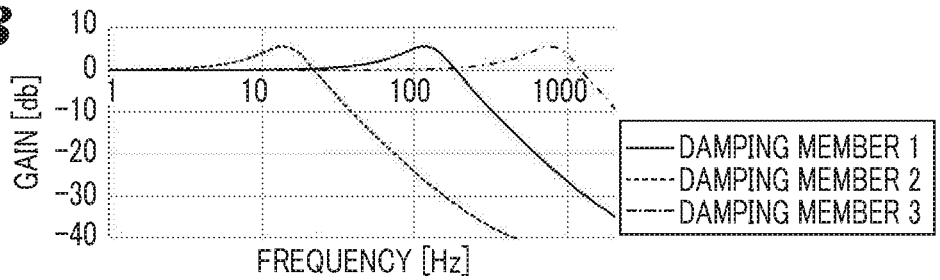
Figure 6C:
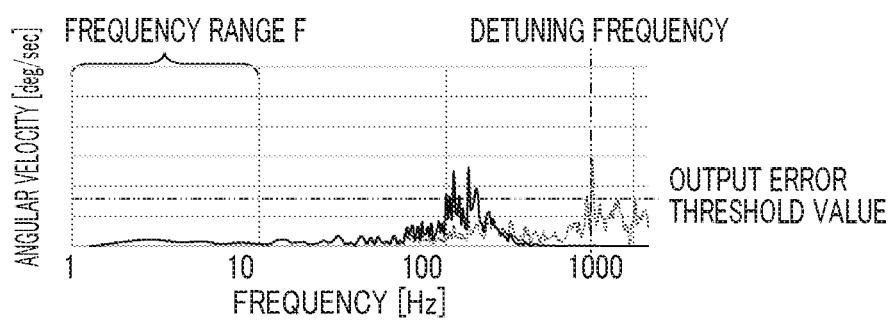

FIGS. 6A to 6E are views useful in explaining vibration detection by the vibration detecting apparatus 15 appearing in FIG. 2. FIG. 6A is a view showing vibration caused by shutter shock, and FIG. 6B is a view showing frequency characteristics of damping members. FIG. 6C is a view showing an angular signal corresponding to an angular velocity signal output from a gyro sensor.

In FIG. 6A, the vertical axis indicates angular velocity, and the horizontal axis indicates frequency. A frequency range F means a camera shake frequency range, and a chain double-dashed line in a vertical direction indicates the detuning frequency. A chain double-dashed line in a horizontal direction indicates a threshold value (output error threshold value) at which the output error occurs.

In FIG. 6B, a solid line indicates frequency characteristics of a damping member (hereafter referred to as the damping member 1) whose resonant frequency is around 100 Hz. A dotted line indicates frequency characteristics of a damping member (hereafter referred to as the damping member 2)

whose resonant frequency is as low as the camera shake frequency range. Long and short dashed lines indicate frequency characteristics of a damping member (hereafter referred to as the damping member 3) whose resonant frequency is as high as a detuning frequency range.

Figure 6D:
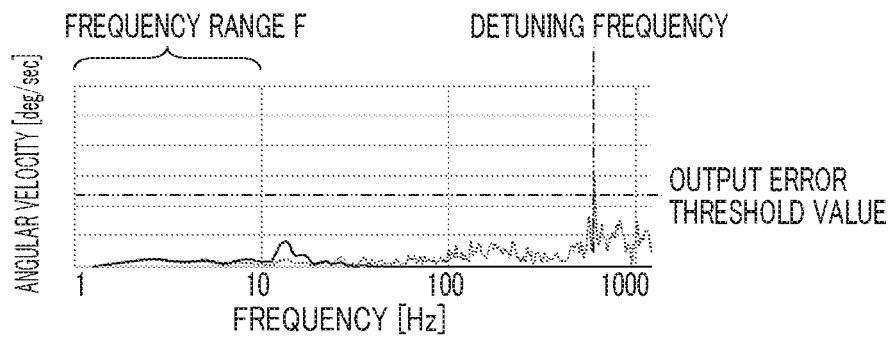
Figure 6E:
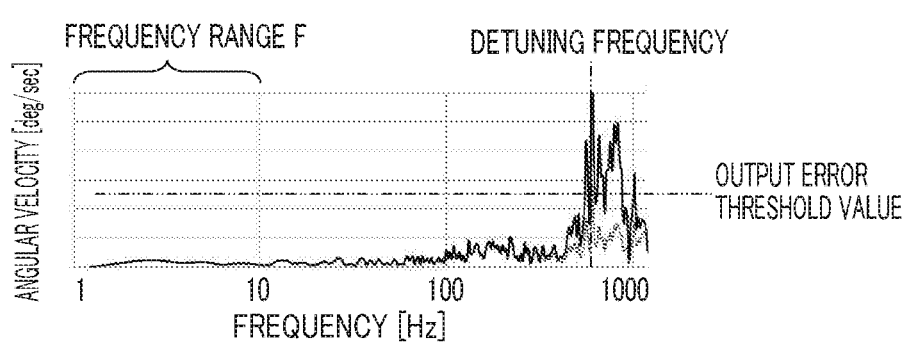

FIGS. 6C to 6E show changes in angular signal when the shutter shock shown in FIG. 6A is input via the damping members 1 to 3. In FIGS. 6C to 6E, broken lines indicate vibrations in response to the shutter shock, and solid lines indicate frequencies of vibrations input to the gyro sensor via the respective damping members 1 to 3.

Referring to FIG. 6C, the vibration frequency does not change in the camera shake frequency range, and the vibration at the detuning frequency decreases. As a result, the vibration frequency is below the output error threshold value.

Referring to FIG. 6D, the vibration at the detuning frequency is below the output error threshold value, but since the resonant frequency is as low as about 10 Hz, the image stabilization accuracy becomes worse due to degradation of responsivity caused by a phase delay. In FIG. 6E, the vibration at the detuning frequency is amplified to exceed the output error threshold value, and it is feared that the image stabilization accuracy will become worse due to the output error.

Therefore, it is preferred that the all resonant frequencies in the directions of the detection axes of the gyro sensors 22 are equal to or higher than the camera shake frequency range and lower than the detuning frequency.

However, the resonant frequencies in the directions of the detection axes in the damping members vary because of variations in inertial moment in the directions of the detection axes of the gyro sensors 22 due to a shape of the gyro sensor holder 21, variations in characteristics of the damping members, and so forth. In general, when a damping member is used so as to reduce vibrations, the damping member having a flat shape is used in many cases.

Figure 7A:
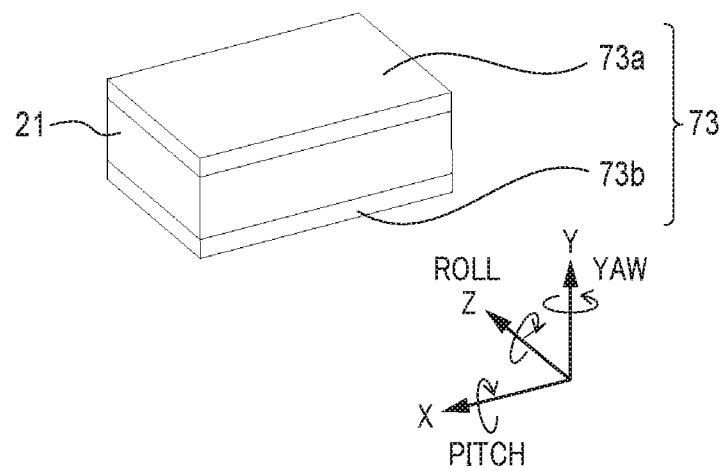
FIGS. 7A to 7C are views useful in explaining resonant frequencies when a gyro sensor holder is sandwiched between damping members.
Figure 7B:
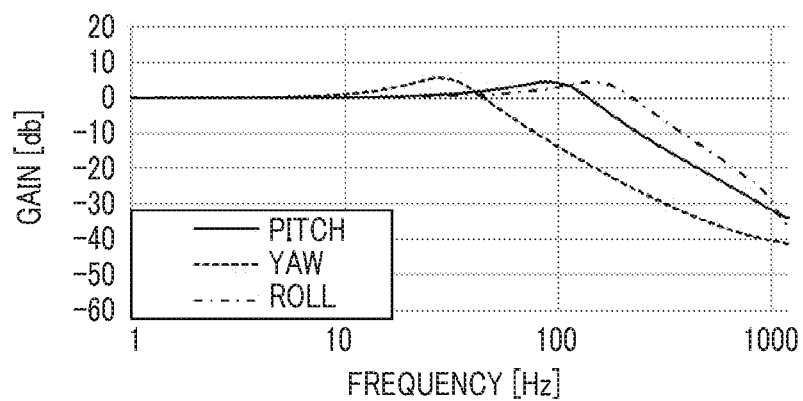
Figure 7C:
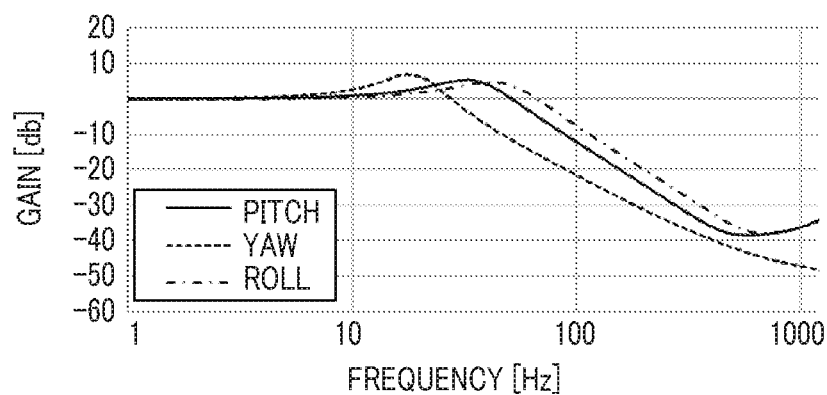

FIGS. 7A to 7C are views useful in explaining the resonance frequencies when a gyro sensor holder is sandwiched between damping members. FIG. 7A is a view showing, as a comparative example, a state in which the gyro sensor holder is sandwiched between a first damping member and a second damping member which have a flat shape, and FIG. 7B is a graph showing the resonant frequencies in the state shown in FIG. 7A. FIG. 7C is a view showing the resonant frequencies in a case where the gyro sensor holder is held by damping members with a hollow square shape.

In the structure shown in FIG. 7A, the resonant frequencies in the roll, pitch, and yaw directions of the damping members 73 (73a and 73b) are as shown in FIG. 7B, and the resonant frequency in the yaw direction decreases to a lower than in the pitch and roll directions. However, depending on assembly orientations in the vibration detecting apparatus 15, the resonant frequency in the pitch direction may decrease to a lower frequency than those in the other directions.

Thus, there may be cases where the resonant frequencies in the detecting axes in the roll, pitch, and yaw directions of the damping members 73 cannot be equal to or higher than the camera shake frequency range and lower than the detuning frequency.

For this reason, to make the resonant frequencies in the respective detection axes uniform, the resonant frequencies are adjusted using a procedure described below.

The resonant frequency fn is proportional to the square root of a modulus of longitudinal elasticity E or a modulus of transverse elasticity G as represented by a mathematical expression (1) below.

[Mathematical Expression 1]

$$f_n \propto \sqrt{E (\text{or } G)} \quad (1)$$

The modulus of longitudinal elasticity E and the modulus of transverse elasticity G can be obtained according to an equation (2) below using Poisson's ratio ν.

[Mathematical Expression 2]

$$E = 2G(1+\nu) \quad (2)$$

Poisson's ratio ν of damping members is a positive value, and hence the modulus of longitudinal elasticity E is greater than the modulus of transverse elasticity G, and the resonant frequency fn is higher when the modulus of longitudinal elasticity E is used. The resonant frequency in the compression direction is obtained using the modulus of longitudinal elasticity E, and the resonant frequency in the shear direction is obtained using the modulus of transverse elasticity G. Thus, the resonant frequency in the compression direction is higher than that in the shear direction.

Vibrations in the pitch direction, the yaw direction, and the roll direction can be input to the vibration detecting apparatus 15. Vibrations in the yaw direction apply force to the damping members 73 only in the shear direction. Vibrations in the pitch or roll direction apply force to the damping members 73 in both the shear direction and the compression direction. For this reason, decreasing only the resonant frequency in the compression direction can decrease the resonant frequencies in the pitch and roll directions without decreasing the resonant frequency in the yaw direction.

The resonant frequency is proportional to the square root of the area of abutment, and hence the resonant frequency in the compression direction can be decreased by reducing the area against which the damping members 73 abut. The resonant frequency is also proportional to the square root of the stiffness of the damping members 73, and the stiffness in the rotational direction increases and decreases with increase and decrease in the maximum distance from a rotational center of the gyro sensor 21 to outer peripheries of the damping members 73.

Therefore, if the area against which the damping members 73 abut is simply reduced according to a similar figure of the flat shape, the maximum distance from the rotational center of the gyro sensor holder 21 to the outer periphery of the damping members 73 will change, causing the stiffness in the rotational direction to decrease and causing the resonant frequency in the yaw direction to decrease as well. Thus, to decrease the stiffness only in the compression direction, the area against which the damping members 73 abut needs to be reduced without changing the maximum distance from the rotational center of the gyro sensor holder 21 to the outer peripheries of the damping members 73.

Accordingly, in the present embodiment, the damping members have the hollow square shape. As a result, the areas against which the damping member 73 abuts can be reduced without changing the maximum distance from the center of rotation of the gyro sensor holder 21 to the outer periphery of the damping members 73. As a result, the resonant frequencies in the pitch direction and the roll direction can be decreased without changing the resonant frequency in the yaw direction.

FIG. 7C shows resonant frequencies in the case where the damping members with the hollow square shape are used. In FIG. 7C, comparing with in a case of FIG. 7B, the resonant frequencies in the pitch direction and the roll direction decrease while the resonant frequency in the yaw direction does not change. Further, because of the hollow square shape, the gyro sensor holder can be sandwiched by substantially single-piece damping members, and hence workability in assembly can be improved.

In addition, the angular velocity in the roll direction has a smaller effect on the anti-vibrating performance of the camera than those in the other directions. For this reason, when it is difficult to make the resonant frequencies in all the detection axes uniform, the resonant frequencies in the pitch direction and the roll direction, which have a greater effect on the anti-vibrating performance of the camera, are to be made uniform.

If the resonant frequency in the roll direction is too low, the image stabilization accuracy decreases due to degradation of responsivity caused by a phase delay. On the other hand, if the frequency around the detuning frequency is amplified due to the resonant frequency being high, the output error can be avoided by performing signal processing such as filtering. Therefore, in a case where it is impossible to make the resonant frequencies in all the detection axes uniform, the resonant frequency in the roll direction is preferably high.

Assuming that, for example, the layout in which the abutting surfaces of the gyro sensor holder 21 and the damping members 23 are perpendicular (on an XY plane in the figure) to the optical axis (the Z-axis in the figure) is adopted, the roll direction is "such a rotational direction that force only in the shear direction is applied to the damping members". In this case, the resonant frequency in the roll direction is low. To avoid this, the abutting surfaces of the gyro sensor holder 21 and the damping members 23 are made parallel (in the direction of the Z-axis) to the optical axis so as to make the resonant frequency in the roll direction high.

It should be noted that in the present embodiment, the first damping member 23a and the second damping member 23b have the same shape, and are placed symmetrically about an XZ plane passing through a center of the gyro sensor holder 21. However, even when damping members do not have the same shape and are not placed symmetrically as above, the resonant frequencies can be still adjusted.

Thus, in the first embodiment of the present invention, the resonant frequencies in the damping members in the directions of the detection axes of the multiple gyro sensors can be made substantially uniform, and camera shake can be detected with high accuracy.

A description will now be given of an example of a camera according to a second embodiment of the present invention. The camera according to the second embodiment has the same arrangement as the camera shown in FIG. 1.

Figure 8:
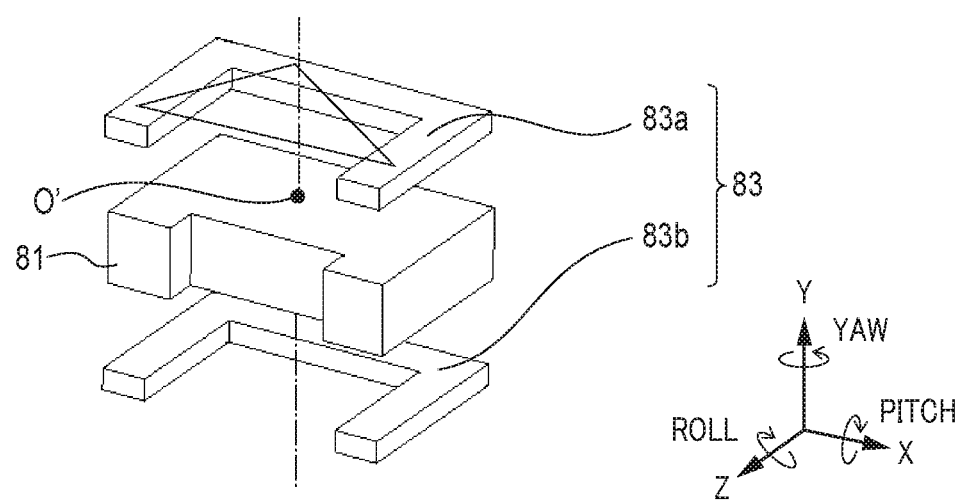
FIG. 8 is a view useful in explaining a structure of a vibration detecting apparatus for use in a camera according to a second embodiment of the present invention.

FIG. 8 is a view useful in explaining a structure of a vibration detecting apparatus for use in the camera according to the second embodiment of the present invention.

In the first embodiment described above, the damping members 23 have a shape that covers the entire circumferences of the outer peripheries of the respective surfaces of the gyro sensor holder 21 which the damping members 23 face. On the other hand, damping members 83 in the second embodiment have a shape that covers a part of outer peripheries of respective surfaces of a gyro sensor holder 81 which the damping members 83 face. Even when the damping members 83 have the shape according to the second embodiment, a triangle including a point O', which is obtained by projecting a barycenter of the gyro sensor holder 81 onto a surface parallel to a surface abutting against the first damping member 83a can be formed by three points inside the first damping member 83a. The same applies to the second damping member 83b.

As shown in FIG. 8, the gyro sensor holder 81 is not a rectangular parallelepiped but is formed by cutting out a part of a rectangular parallelepiped. If the damping members 83 (83a and 83b) have a shape that covers the entire circumferences of the outer peripheries of the respective surfaces of the gyro sensor holder 81 which the damping members 83 face, the shape of the damping members 83 will become complicated. If the shape of the damping members 83 becomes complicated, the cost for machining may increase, and workability may decrease.

To avoid this, the damping members 83 have a shape (for example, a squared U-shape) that covers a part of the outer peripheries of the respective surfaces of the gyro sensor holder 81 which the damping members 83 face. As a result, the first damping member 83a and the second damping member 83b can be comprised of one component while the shape of the damping members 83 is prevented from becoming complicated. This improves workability in assembly.

In the second embodiment, the first damping member 83a and the second damping member 83b have the same shape, and are placed symmetrically about an XZ plane passing through a center of the gyro sensor holder 81. However, even when damping members do not have the same shape and are not placed symmetrically, the resonant frequencies can be still adjusted.

Thus, also in the second embodiment of the present invention, the resonant frequencies in the damping members in the directions of the detection axes of the multiple gyro sensors can be made substantially uniform, and camera shake can be detected with high accuracy.

A description will now be given of an example of a camera according to a third embodiment of the present invention. The camera according to the third embodiment of the present invention has the same arrangement as the camera shown in FIG. 1.

Figure 9A:
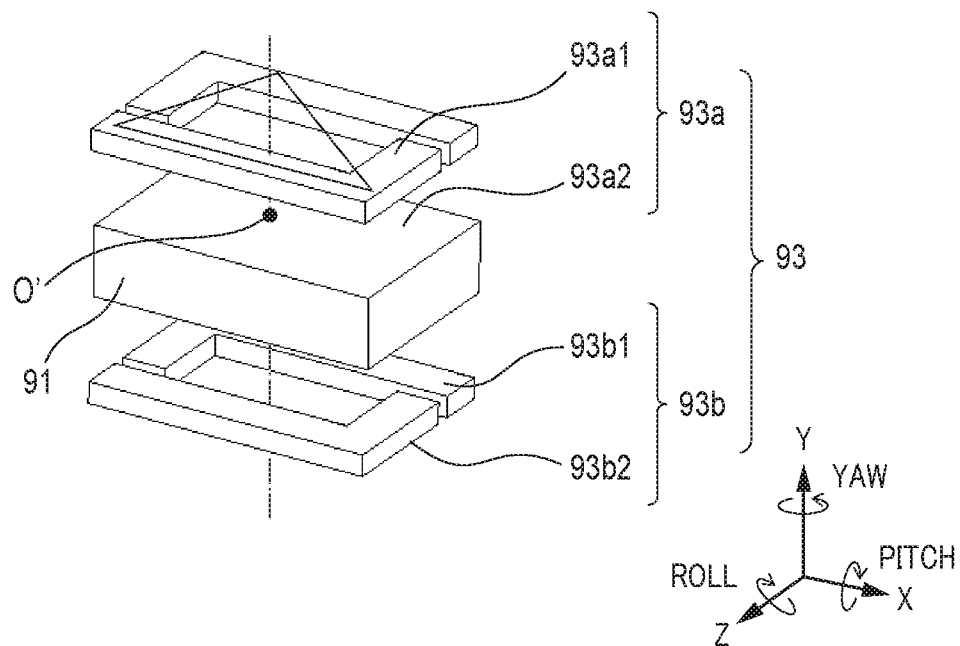
FIGS. 9A and 9B are views useful in explaining a structure of a vibration detecting apparatus for use in a camera according to a third embodiment of the present invention.
Figure 9B:
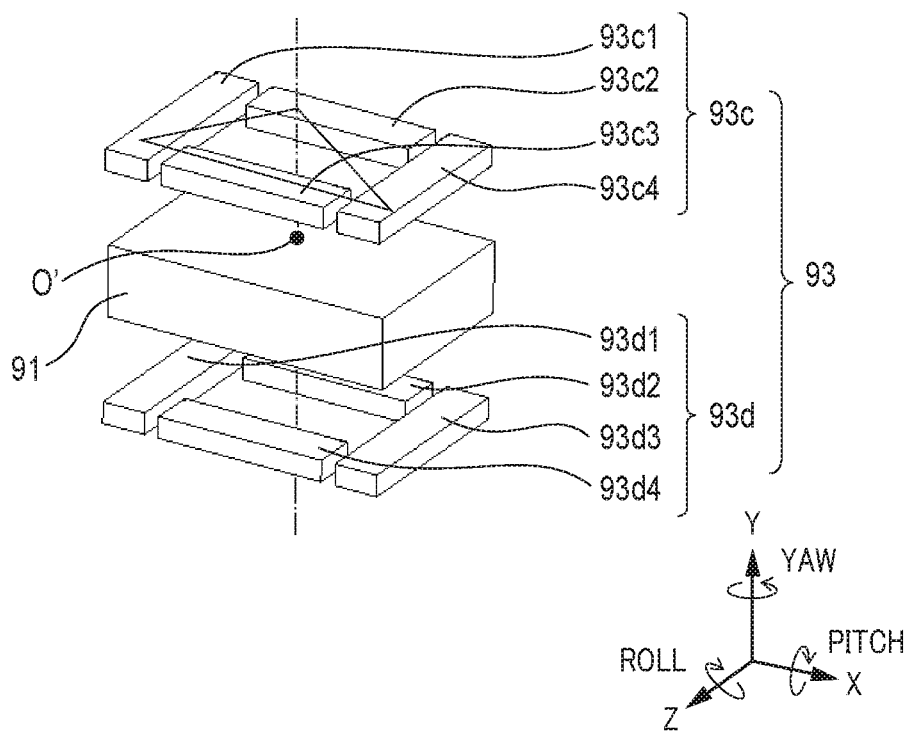

FIGS. 9A and 9B are views useful in explaining a structure of a vibration detecting apparatus for use in the camera according to the third embodiment of the present invention. FIG. 9A is a perspective view showing an example of a gyro sensor holder and damping members, and FIG. 9B is a perspective view showing another example of the gyro sensor holder and the damping members.

In the third embodiment, the damping members 93 (93a and 93b, or 93c and 93d) have a shape that covers a part of outer peripheries of respective surfaces of the gyro sensor holder 91 which the damping members 93 face. Each of the damping members 93 is comprised of a plurality of pieces of damping members.

Even when the damping members 93 have the shape shown in FIGS. 9A and 9B, a triangle including a point O', which is obtained by projecting a barycenter of the gyro sensor holder 91 onto a surface parallel to a surface abutting against the first damping member 93a (93c) can be formed by three points inside the first damping member 93a. The same applies to the second damping member 93b (93d).

Referring to FIG. 9A, two L-shaped members are used for each of the first damping member 93a and the second damping member 93b. These two L-shaped members are combined together to form a damping member that has a square hollow shape.

Referring to FIG. 9B, four I-shaped members are used for each of the first damping member 93c and the second damping member 93d. These four two I-shaped members are combined together to form a damping member that has a square hollow shape.

Such damping members 93 being comprised a plurality of members enable yield in machining to be enhanced, leading to cost reduction.

In the third embodiment, the first damping member 93a (93c) and the second damping member 93b (93d) have the same shape, and are placed symmetrically about an XZ plane passing through a center of the gyro sensor holder 91. However, even when damping members do not have the same shape and are not placed symmetrically, the resonant frequencies can be still adjusted.

Thus, also in the third embodiment of the present invention, the resonant frequencies in the damping members in the directions of the detection axes of the multiple gyro sensors can be made substantially uniform, and camera shake can be detected with high accuracy.

A description will now be given of an example of a camera according to a fourth embodiment of the present invention. The camera according to the fourth embodiment of the present invention has the same arrangement as the camera shown in FIG. 1.

Figure 10:
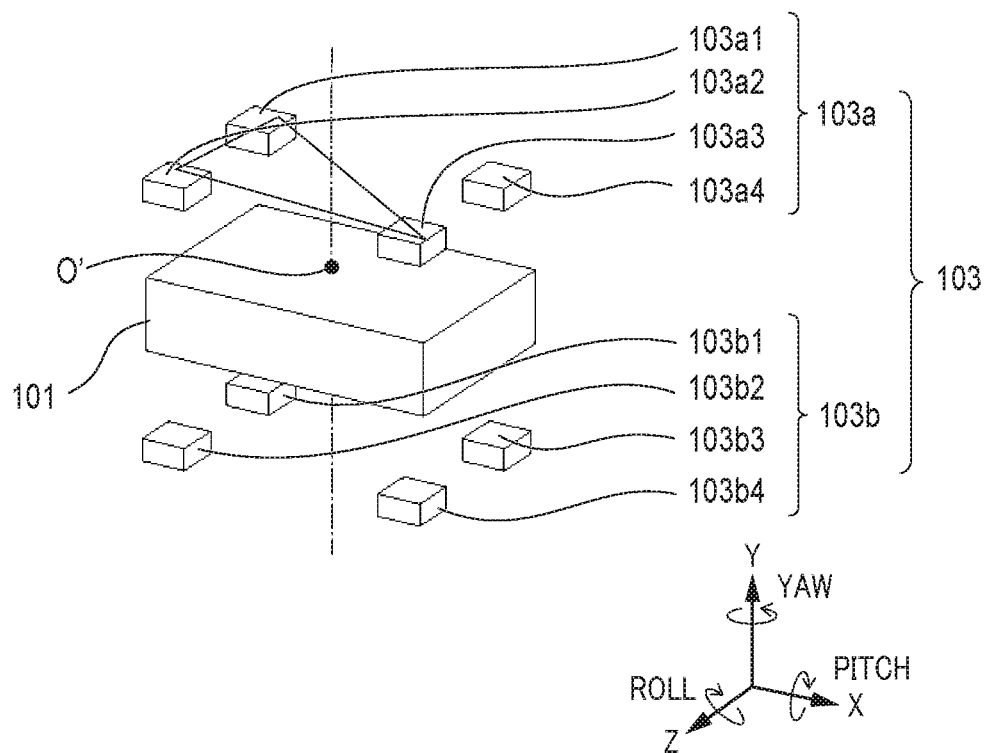
FIG. 10 is a view useful in explaining a structure of a vibration detecting apparatus for use in a camera according to a fourth embodiment of the present invention.

FIG. 10 is a view useful in explaining a construction of a vibration detecting apparatus for use in the camera according to the fourth embodiment of the present invention.

In the fourth embodiment, damping members 103 (103a and 103b) have a shape that covers a part of outer peripheries of respective surfaces of a gyro sensor holder 101 which the damping members 103 face. The first damping member 103a and the second damping members 103b are located at four corners of respective surfaces of the gyro sensor holder 101 which the damping members 103a, 103b face. Namely, the damping member 103a includes members 103a1 to 103a4, and the second damping member 103b includes members 103b1 to 103b4.

Even when the damping members 103 have the shape shown in FIG. 10, a triangle including a point O', which is obtained by projecting a barycenter of the gyro sensor holder 101 onto a surface parallel to a surface abutting against the first damping members 103a can be formed by three points inside the first damping member 103a. The same applies to the second damping members 103b.

Referring to FIG. 10, the first damping member 103a and the second damping members 103b have their members (103a1 to 103a4, 103b1 to 103b4) located at the four corners of the respective surfaces of the gyro sensor holder 101 which the damping members face. As a result, the area against which the damping members 103 abut can be reduced to the greatest extent possible without changing the maximum distance from a center of rotation of the gyro sensor holder 101 to the outer peripheries of the damping members 103. As a result, the resonant frequencies in the pitch and roll directions can be significantly decreased without changing the resonant frequency in the yaw direction. It should be noted that the first damping members 103a and the second damping members 103b may have additional members placed between the four corners as well as the members located at the four corners.

In the fourth embodiment, the first damping members 103a and the second damping members 103b have the same shape, and are placed symmetrically about an XZ plane passing through a center of the gyro sensor holder 101. However, even when damping members do not have the same shape and are not placed symmetrically, the resonant frequencies can be still adjusted.

Thus, in the fourth embodiment of the present invention, the resonant frequencies in the damping members in the directions of the detection axes of the multiple gyro sensors can be made substantially uniform, and camera shake can be detected with high accuracy.

A description will now be given of an example of a camera according to a fifth embodiment of the present invention. The camera according to the fifth embodiment has the same arrangement as the camera shown in FIG. 1.

FIG. 1 is a view useful in explaining a structure of a vibration detecting apparatus for use in the camera according to the fifth embodiment of the present invention.

Figure 11:
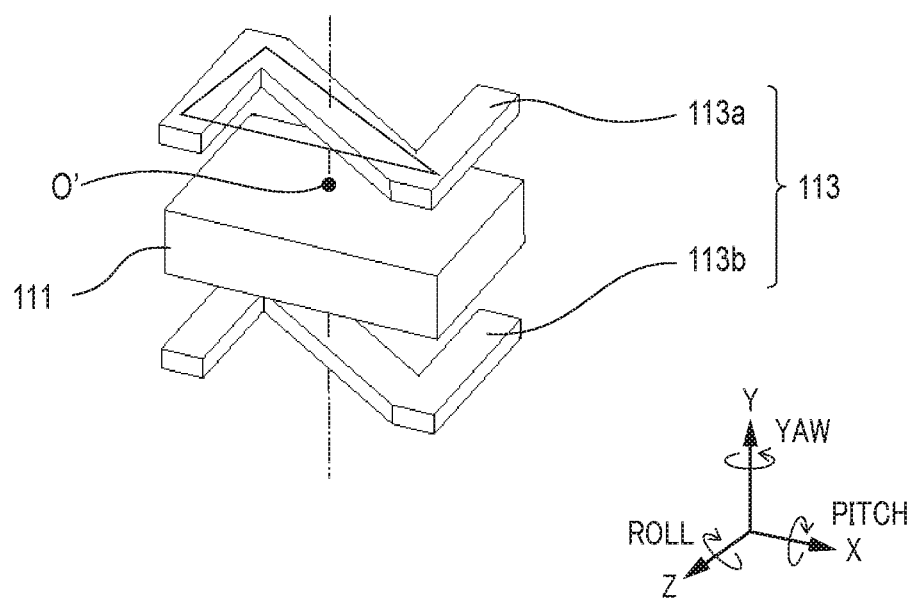
FIG. 11 is a view useful in explaining a structure of a vibration detecting apparatus for use in a camera according to a fifth embodiment of the present invention.

In the fifth embodiment, damping members 113 (113a and 113b) have a shape that covers a part of respective surfaces of a gyro sensor holder 11 which the damping members 113 face. Even when the damping members 113 have the shape shown in FIG. 11, a triangle including a point O', which is obtained by projecting a barycenter of the gyro sensor holder 111 onto a surface parallel to a surface abutting against the first damping member 113a can be formed by three points inside the first damping member 113a. The same applies to the second damping member 113b.

To reduce the area against which the damping members 113 abut without changing the maximum distance from a center of rotation of the gyro sensor holder 111 to the outer peripheries of the damping members 113, it is preferred that the damping members 113 are placed at four corners of the gyro sensor holder 111 as with the fourth embodiment. On the other hand, when each damping member 113 is comprised of a plurality of members, workability in assembly will decrease, leading to cost increase.

Accordingly, here, each damping member 113 is comprised of one member such that portions of the damping member 113 are located at four corners of the gyro sensor holder 111. For example, the damping member 113 is Z-shaped as shown in the figure.

Since each damping member is comprised of one member, the resonant frequencies in the pitch and the roll directions can be decreased without changing the resonant frequency in the yaw direction, and in addition, workability in assembly can be improved.

In the fifth embodiment, the first damping member 113a and the second damping member 113b have the same shape, and are placed symmetrically about an XZ plane passing through a center of the gyro sensor holder 11. However, even when damping members do not have the same shape and are not placed symmetrically, the resonant frequencies can be still adjusted.

Thus, also in the fifth embodiment of the present invention, the resonant frequencies in the damping members in the directions of the detection axes of the multiple gyro sensors can be made substantially uniform, and camera shake can be detected with high accuracy.

A description will now be given of an example of a camera according to a sixth embodiment of the present invention. The camera according to the sixth embodiment has the same arrangement as the camera shown in FIG. 1.

Figure 12:
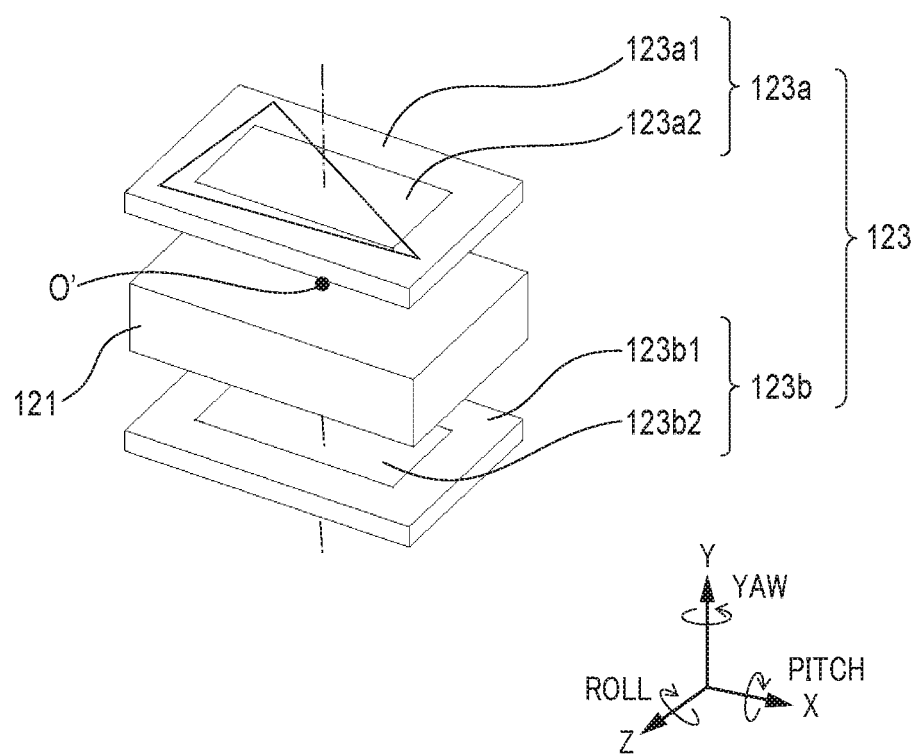
FIG. 12 is a view useful in explaining a structure of a vibration detecting apparatus for use in a camera according to a sixth embodiment of the present invention.

FIG. 12 is a view useful in explaining a structure of a vibration detecting apparatus for use in the camera according to the sixth embodiment of the present invention.

In the sixth embodiment, damping members 123 (123a and 123b) have a flat shape, and are divided into first areas 123a1, 123b1 constituting outer peripheral portions and second areas 123a2, 123b2 constituting central portions. That is, the first areas 123a1, 123b1 respectively surround the second areas 123*a*2, 123*b*2. The first areas 123*a*1 and 123*b*1 have higher stiffness than the second areas 123*a*2 and 123*b*2.

Even when the damping members 123 have the shape shown in FIG. 12, a triangle including a point O', which is obtained by projecting a barycenter of the gyro sensor holder 121 onto a surface parallel to a surface abutting against the first damping member 123*a* can be formed by three points inside the first area 123*a*1. The same applies to the second damping member 123*b*.

In the first embodiment described earlier, the damping members 23 have the hollow square shape so as to decrease the resonant frequency in the compression direction. On the other hand, even in the case where a central portion of a damping member is comprised of a member with sufficiently lower stiffness than an outer peripheral portion of the damping member instead of making the central portion hollow, the same effects can be obtained as in the first embodiment. In this case, the damping member has a flat shape, and hence workability is better than in the case where it has the hollow square shape.

In the sixth embodiment, the first damping member 123*a* and the second damping member 123*b* have the same shape, and are placed symmetrically about an XZ plane passing through a center of the gyro sensor holder 121. However, even when damping members do not have the same shape and are not placed symmetrically, the resonant frequencies can be still adjusted. It should be noted that for the arrangement in which the central portion is comprised of a member with sufficiently lower stiffness than the outer peripheral portion as with the present embodiment, any of the arrangement in the second to fifth embodiments may be adopted, and a member with low stiffness may be placed in an area where no damping member is provided in each of the embodiments.

Thus, also in the sixth embodiment of the present invention, the resonant frequencies in the damping members in the directions of the detection axes of the multiple gyro sensors can be made substantially uniform, and camera shake can be detected with high accuracy.

A description will now be given of an example of a camera according to a seventh embodiment of the present invention. The camera according to the seventh embodiment has the same arrangement as the camera shown in FIG. 1.

Figure 13:
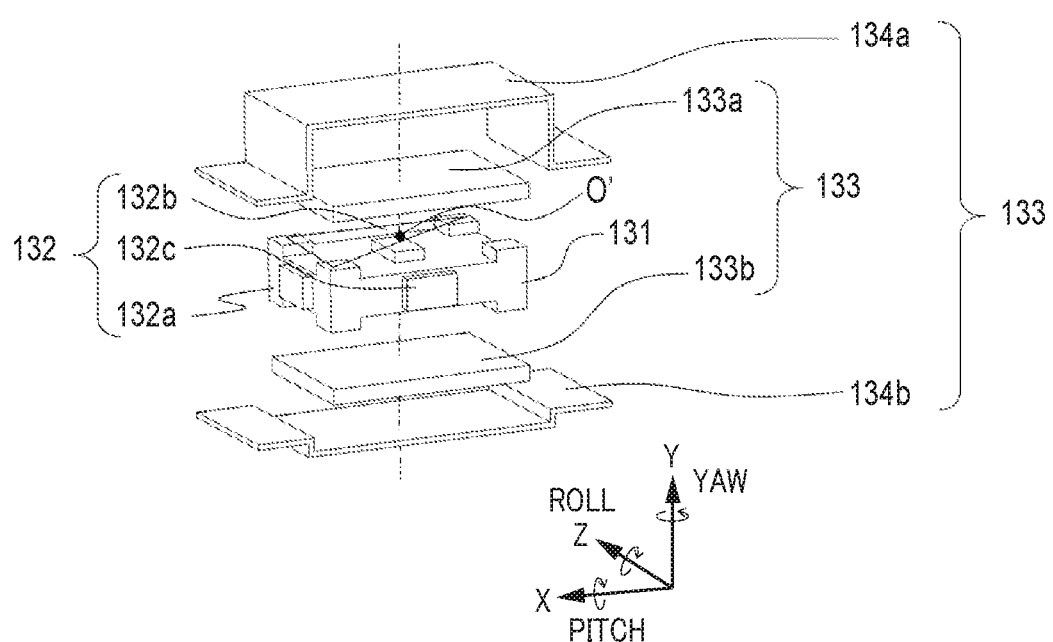
FIG. 13 is a view useful in explaining a structure of a vibration detecting apparatus for use in a camera according to a seventh embodiment of the present invention.

FIG. 13 is a view useful in explaining a construction of a vibration detecting apparatus for use in the camera according to the seventh embodiment of the present invention.

In the first to sixth embodiments described above, the damping members have the shapes that cover the entire circumferences or a part of the outer peripheries of the respective surfaces of the gyro sensor holder which the damping members face. On the other hand, in the seventh embodiment, damping members 133 (133*a* and 133*b*) have a flat shape, and the area of the flat portion is equal to or greater than the area of a surface of a gyro sensor holder 131, against which the damping members 133 abut. In the present embodiment, portions of the gyro sensor holder 131 which abut against the damping members 133 are arranged at portions facing four corners of the damping members 133 and protrude as compared to a portion of the gyro sensor holder 131 which does not abut against the damping members 133. It should be noted that there will be no problem if the surfaces of the gyro sensor holder 131 which abut against the damping members 133 have a hollow square shape or a squared U-shape.

Even when the damping members 131 have the shape shown in FIG. 13, a triangle including a point O', which is obtained by projecting a barycenter of the gyro sensor holder 131 onto a surface parallel to a surface abutting against the first damping member 133*a* can be formed by three points inside the surfaces of the gyro sensor holder 131 which abut against the first damping member 133*a*. The same applies to the second damping member 133*b*.

In the first to sixth embodiments described above, the area of a region of the damping members to be abutted is reduced so as to decrease the resonant frequency in the compression direction. On the other hand, even when the damping member is formed in flat shape and the area of a region of the gyro sensor holder to be abutted against the damping members is reduced as with the present embodiment, the same effects can be obtained as in the first to sixth embodiments. The damping members with the flat shape in the present embodiment are better in terms of workability than the damping members with the hollow square shape.

In the seventh embodiment, the first damping member 133*a* and the second damping member 133*b* have the same shape, and are placed symmetrically about an XZ plane passing through a center of the gyro sensor holder 131. However, even when damping members do not have the same shape and are not placed symmetrically, the resonant frequencies can be still adjusted.

Furthermore, in the seventh embodiment, the damping members 133 (133*a* and 133*b*) have the flat shape, and the area of the flat portion is equal to or greater than the area of the surfaces of the gyro sensor holder 131 which abut against the damping members 133.

Figure 14:
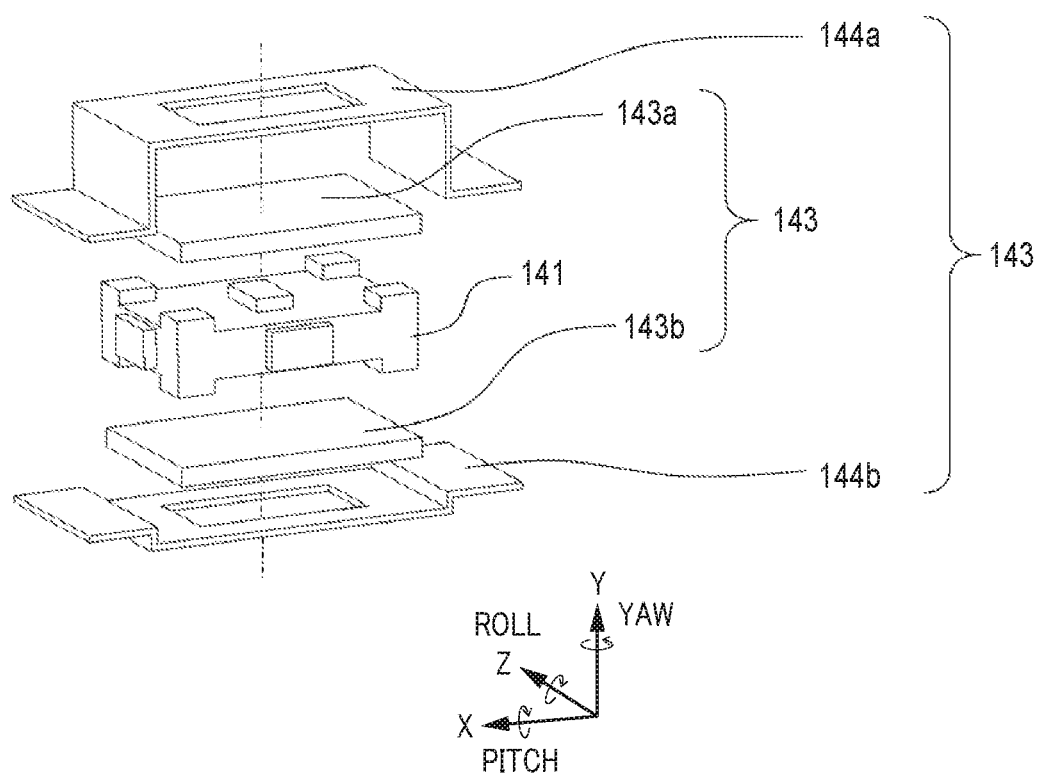
FIG. 14 is a view useful in explaining a variation of the structure of the vibration detecting apparatus for use in the camera according to the seventh embodiment of the present invention.

FIG. 14 is a view useful in explaining a variation of the structure of the vibration detecting apparatus appearing for use in the camera according to the seventh embodiment of the present invention.

On the other hand, as shown in FIG. 14, the area of surfaces of holding members 144 (144*a* and 144*b*) which abut against damping members 143 (143*a* and 143*b*) may be smaller than the area of a flat portion of the damping members 143. Furthermore, even when both the area of abutting surfaces of the gyro sensor holder 141 and the damping members 143 and the area of abutting surfaces of the holding members 144 and the damping members 143 are smaller than the area of the flat portion of the damping members 143, the resonant frequency can be still adjusted.

Thus, also in the seventh embodiment of the present invention, the resonant frequencies of the damping members in the directions of the detection axes of the multiple gyro sensors can be made substantially uniform, and camera shake can be detected with high accuracy.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-057074, filed Mar. 25, 2019, which is hereby incorporated by reference herein in its entirety.

What is claimed is:

1. A shake detecting apparatus comprising:
a shake detecting sensor configured to detect shake;
a sensor holder configured to hold the shake detecting sensor;
a first damping member configured to abut against a first surface of the sensor holder; and
a second damping member configured to abut against a second surface of the sensor holder which is opposite to the first surface in a predetermined direction,
wherein the first damping member abuts against at least a part of an outer peripheral portion of the first surface, and the area of a region of the first damping member which abuts against the first surface is smaller than the area of the first surface, and
the second damping member abuts against at least a part of an outer peripheral portion of the second surface, and the area of a region of the second damping member which abuts against the second surface is smaller than the area of the second surface.

2. The shake detecting apparatus according to claim 1, wherein
a plurality of the shake detecting sensors is provided for respective coordinate axes of a three-dimensional coordinate, and
abutting surfaces of the sensor holder and the first damping member and abutting surfaces of the sensor holder and the second damping member are perpendicular to one of detecting axes of the plurality of shake detecting sensors.

3. The shake detecting apparatus according to claim 1, wherein abutting surfaces of the sensor holder and the first damping member and abutting surfaces of the sensor holder and the second damping member are substantially parallel to an optical axis of an image pickup apparatus which is equipped with the shake detecting apparatus.

4. The shake detecting apparatus according to claim 1, wherein each of the first damping member and the second damping member is molded of one member.

5. The shake detecting apparatus according to claim 1, wherein each of the first damping member and the second damping member is molded in a square U-shape as seen in a direction perpendicular to the surfaces abutting against the sensor holder.

6. The shake detecting apparatus according to claim 1, wherein the first damping member abuts against the entire circumference of the outer peripheral portion of the first surface, and the second damping member abuts against the entire circumference of the outer peripheral portion of the second surface.

7. The shake detecting apparatus according to claim 1, wherein each of the first damping member and the second damping member is molded in a square hollow shape as seen in a direction perpendicular to the surfaces abutting against the sensor holder.

8. The shake detecting apparatus according to claim 1, wherein each of the first damping member and the second damping member comprises a plurality of members.

9. The shake detecting apparatus according to claim 8, wherein in the first damping member, the plurality of members is placed at four corners of the first surface, and in the second damping member, the plurality of members is placed at four corners of the second surface.

10. The shake detecting apparatus according to claim 1, wherein the sensor holder, the first damping member, and the second damping member are placed such that a triangle including a point, which is obtained by projecting a barycenter of the sensor holder onto a surface parallel to a surface where the sensor holder and the first damping member abut against each other is formed by three points inside the first damping member, and a triangle including a point, which is obtained by projecting the barycenter of the sensor holder onto a surface parallel to a surface where the sensor holder and the second damping member abut against each other is formed by three points inside the second damping member.

11. The shake detecting apparatus according to claim 1, wherein the first surface includes a central portion,
wherein the outer peripheral portion of the first surface is closer to the edge of the first surface than the central portion of the first surface,
wherein the second surface includes a central portion, and
wherein the outer peripheral portion of the second surface is closer the edge of the second surface than the central portion of the second surface.

12. The shake detecting apparatus according to claim 11, wherein the shake detecting sensor are placed on either one of the central portion of the first surface and the central portion of the second surface.

13. The shake detecting apparatus according to claim 11, wherein the central portion of the first surface does not abut against the first damping member, and wherein the central portion of the second surface does not abut against the second damping member.

14. A shake detecting apparatus comprising:
a shake detecting sensor configured to detect shake;
a sensor holder configured to hold the shake detecting sensor;
a first damping member configured to abut against a first surface of the sensor holder; and
a second damping member configured to abut against a second surface of the sensor holder which is opposite to the first surface in a predetermined direction,
wherein each of the first damping member and the second damping member has a first region and a second region,
the first region has higher stiffness than that of the second region, and
the second region is surrounded by the first region as seen in the predetermined direction.

15. A vibration detecting apparatus comprising:
a shake detecting sensor configured to detect shake;

a sensor holder configured to hold the shake detecting sensor;

a first damping member configured to abut against a first surface of the sensor holder; and a second damping member configured to abut against a second surface of the sensor holder which is opposite to the first surface in a predetermined direction, wherein the first damping member abuts against at least a part of an outer peripheral portion of the first surface, the second damping member abuts against at least a part of an outer peripheral portion of the first surface, a region of the first surface which abuts against the first damping member protrudes as compared to a region of the first surface which does not abut against the first damping member, a region of the second surface which abuts against the second damping member protrudes as compared to a region of the second surface which does not abut against the second damping member.

16. The shake detecting apparatus according to claim 15, wherein a plurality of the shake detecting sensors is provided for respective coordinate axes of a three-dimensional coordinate, and abutting surfaces of the sensor holder and the first damping member and abutting surfaces of the sensor holder and the second damping member are perpendicular to one of detecting axes of the plurality of shake detecting sensors.

17. The shake detecting apparatus according to claim 15, wherein abutting surfaces of the sensor holder and the first damping member and abutting surfaces of the sensor holder and the second damping member are substantially parallel to an optical axis of a lens.

18. The shake detecting apparatus according to claim 15, wherein regions abutting against the first damping member are placed at locations of the sensor holder which are opposed to four corners of the first damping member, and regions abutting against the second damping member are placed at locations of the sensor holder which are opposed to four corners of the second damping member.

19. The shake detecting apparatus according to claim 15, wherein the sensor holder, the first damping member, and the second damping member are placed such that a triangle including a point, which is obtained by projecting a barycenter of the sensor holder onto a surface parallel to a surface where the sensor holder and the first damping member abut against each other is formed by three points inside the abutting surfaces of the sensor holder and the first damping member, and a triangle including a point, which is obtained by projecting a barycenter of the sensor holder onto a surface parallel to a surface where the sensor holder and the second damping member abut against each other is formed by three points inside the abutting surfaces of the sensor holder and the second damping member.

20. An image pickup apparatus comprising:
a shake detecting sensor configured to detect shake;
a sensor holder configured to hold the shake detecting sensor;
a first damping member configured to abut against a first surface of the sensor holder;
a second damping member configured to abut against a second surface of the sensor holder which is opposite to the first surface in a predetermined direction;
an image pickup device configured to obtain an image by taking an image of a subject; and at least one processor configured, by executing instructions stored in at least one memory, to correct for image blurring occurring in the image pickup device according to shake detected by the shake detecting sensor, wherein the first damping member abuts against at least a part of an outer peripheral portion of the first surface, and the area of a region of the first damping member which abuts against the first surface is smaller than the area of the first surface, and the second damping member abuts against at least a part of an outer peripheral portion of the second surface, and the area of a region of the second damping member which abuts against the first surface is smaller than the area of the second surface.

21. The image pickup apparatus according to claim 20, wherein the predetermined direction is a direction perpendicular to an optical axis of the image pickup apparatus.

22. The image pickup apparatus according to claim 20, wherein the first surface includes a central portion,
wherein the outer peripheral portion of the first surface is closer to the edge of the first surface than the central portion of the first surface,
wherein the second surface includes a central portion, and
wherein the outer peripheral portion of the second surface is closer to the edge of the second surface of the central portion of the second surface.

23. The image pickup apparatus according to claim 22, wherein the shake detecting sensor is placed on either one of the central portion of the first surface and the central portion of the second surface.

24. The shake detecting apparatus according to claim 22, wherein the central portion of the first surface does not abut against the first damping member,
wherein the central portion of the second surface does not abut against the second damping member.

25. An image pickup apparatus comprising:
a shake detecting sensor configured to detect shake;
a sensor holder configured to hold the shake detecting sensor;
a first damping member configured to abut against a first surface of the sensor holder;
a second damping member configured to abut against a second surface of the sensor holder which is opposite to the first surface in a predetermined direction;
an image pickup device configured to obtain an image by taking an image of a subject; and
at least one processor configured, by executing instructions stored in at least one memory, to correct for image blurring occurring in the image pickup device according to shake detected by the shake detecting sensor,
wherein each of the first damping member and the second damping member has a first region and a second region,
the first region has higher stiffness than that of the second region, and
the second region is surrounded by the first region as seen in the predetermined direction.

26. An image pickup apparatus comprising:
a shake detecting sensor configured to detect shake:
a sensor holder configured to hold the shake detecting sensor;
a first damping member configured to abut against a first surface of the sensor holder:
a second damping member configured to abut against a second surface of the sensor holder which is opposite to the first surface in a predetermined direction;
an image pickup device configured to obtain an image by taking an image of a subject; and at least one processor configured, by executing instructions stored in at least one memory, to correct for image blurring occurring in the image pickup device according to shake detected by the shake detecting sensor, wherein the first damping member abuts against at least a part of an outer peripheral portion of the first surface, the second damping member abuts against at least a part of an outer peripheral portion of the first surface, a region of the first surface which abuts against the first damping member protrudes as compared to a region of the first surface which does not abut against the first damping member, a region of the second surface which abuts against the second damping member protrudes as compared to a region of the second surface which does not abut against the second damping member.

\* \* \* \* \*